Aug. 25, 1925.
C. LE G. FORTESCUE
1,551,298
PHASE BALANCING SYSTEM
Filed Feb. 5, 1921
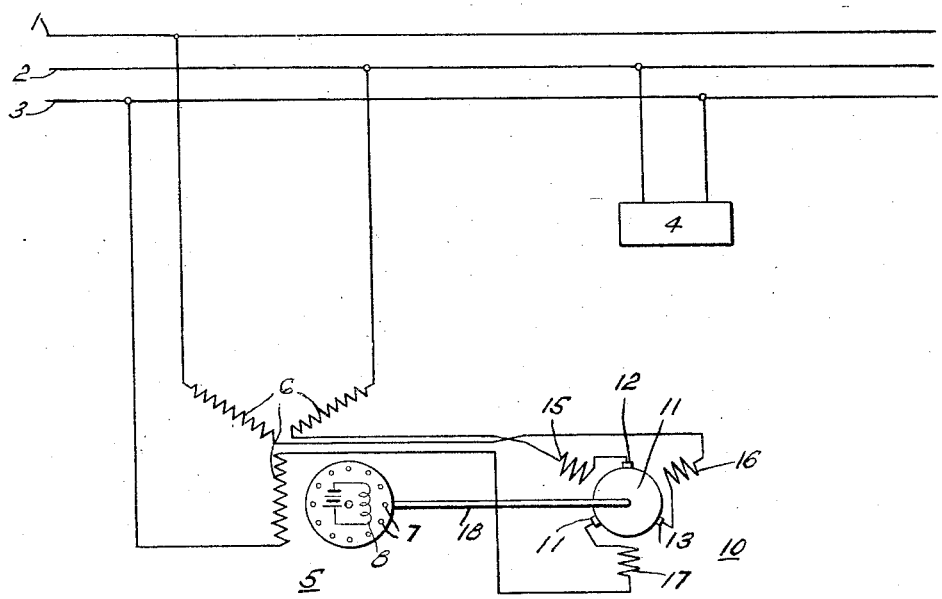
WITNESSES:
K. E. Clowes.
O. B. Buchanan
INVENTOR
Charles LeG. Fortescue.
BY
ATTORNEY Patented Aug. 25, 1925.

1,551,298

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

PHASE-BALANCING SYSTEM.

Application filed February 5, 1921. Serial No. 442,762.

*To all whom it may concern:*

Be it known that I, CHARLES LE G. FORTESCUE, subject of the King of Great Britain, and a resident of Pittsburgh, in the county of Allegheny and State of Pennsylvania, have invented a new and useful Improvement in Phase-Balancing Systems, of which the following is a specification.

My invention relates to phase balancing systems and particularly to a polyphase booster of the commutator type that shall be adapted for use in connection with shunt phase balancers.

In certain respects, my invention is an improvement upon a well-known type of phase-balancer system in which an unbalance polyphase line is brought into balanced condition by means of a shunt-connected synchronous balancer machine, having, in series with its primary winding, a booster supplying backward-phase-sequence electromotive forces of proper phase and magnitude to counteract the impedance of the balancer to the balancing currents. As a result, the balancer circuit is caused to offer, in effect, zero impedance to symmetrical negative-phase-sequence components of currents and the line voltages are perfectly balanced.

In a system of the above mentioned type, the excitation of the series machine is controlled by means of relays, in such manner that the booster electromotive forces are proportional and in definite phase relation to the negative-phase-sequence currents. The necessity for the relays is a very serious drawback, from the standpoint of economy and simplicity.

An object of my invention, therefore, is to produce a booster which will inherently generate an electromotive force of the proper phase and magnitude without the use of relays or automatic regulators.

Furthermore, the above mentioned system of control is dependent upon differences in voltages between the various phases. It is obvious that the comparatively small differences in voltages between phases may be accompanied by a very considerable unbalance in the line currents.

A further object of my invention, therefore, is to secure a much higher degree of sensitivity than is possible with voltage-responsive devices alone.

Another object of my invention is to produce a circuit comprising a polyphase translating device and a booster in series therewith, said booster being a series, commutator-type, polyphase machine having its brushes adjusted to such positions as to substantially neutralize the impedance of the circuit to currents of a given phase sequence.

Other objects of my invention will be apparent from the following description and from the accompanying drawing.

The single figure of the drawing is a diagrammatic view of apparatus and circuits embodying one form of my invention.

Referring to the drawing for a more complete understanding of my invention, I show at 1, 2, 3 an unbalanced polyphase transmission system, the condition of unbalance being indicated by the single-phase load 4. The balancer machine 5 consists of a primary member having a polyphase winding 6 and a secondary member having a good damper winding 7. If desired, a unidirectional-current-exciting winding 8 may be placed on the secondary member.

It is well-known that an unbalanced polyphase system may be resolved into two balanced component systems having different phase sequences. A balancer machine of the class just described, by virtue of its good damper windings, may be made to offer very low impedance to currents of negative phase-sequence. However, on account of the imperfect magnetic coupling between the primary and secondary members of the balancing machine, there will be a certain reactive impedance to said currents of negative phase-sequence, in addition to the impedance resulting from the ohmic resistance of the windings. It is necessary, therefore, to introduce a certain booster electromotive force in order to overcome the impedance of the balancer to said currents of negative phase-sequence.

My booster is a polyphase series commutator machine 10, having a commutator winding 11, brushes 12, 13, 14 and field windings 15, 16, 17. Two of the leads between the phase balancer 5 and the booster 10 are interchanged, in order that the phase-sequence of the booster machine shall be opposite to that of the balancer machine.

It is well-known that, instead of having separate exciting and compensating windings connected in series with each brush, a polyphase commutator type machine may have a single polyphase field winding, which produces a magnetization equivalent to the resultant of the separate field-exciting and compensating windings.

The magneto-motive force of the single polyphase field winding may therefore be resolved into a component in alignment with the various brushes and a component at right angles thereto. The electromotive force generated in the armature winding has a component in phase with the second-mentioned or exciting field winding component, as is well understood.

The neutralizing component of the field winding may be of such magnitude as to completely wipe out the flux in the brush axes or it may be so proportioned that it either partially compensates or over compensates for the reactance flux of the armature winding. It is apparent, therefore, that there is also generated, in each brush axis of the armature, an electromotive force which is in phase with the resultant flux in the brush axes of each of the other phases.

The two above-mentioned electromotive forces, which are generated in the armature winding, may be so proportioned, by properly choosing the brush position and the speed of the machine, that the resultant generated electromotive force will exactly neutralize both the ohmic and the reactive impedance of any circuit. The neutralized impedance may include the internal impedance of the commutator machine itself and also any desired apparatus which may be connected in series therewith.

The commutator machine may be driven by any suitable means having an approximately constant speed. In the drawing, the booster is shown as being mounted upon the shaft 18 of the shunt phase balancer. It is to be understood, however, that this arrangement is not at all necessary. It is also to be understood that the series connection of the booster armature may be made by means of series transformers, whereby the voltage of the booster may be reduced.

In the embodiment shown in the drawing, since the booster is running synchronously, we obtain direct current in the armature windings, said current being of proper magnitude and phase-position to neutralize the impedance of the circuit to negative-phase-sequence component currents. Since the armature winding 11 is running synchronously in a rotating field, there will be no sparking, as the currents in the coils of the armature need no reversing. However, it is not essential that the booster machine be driven at exact synchronism, as the frequency of its generated currents is wholly independent of the speed.

It will be observed that the commutator machine operates as a series balancer, permitting and assisting the flow of currents of negative-phase-sequence, while offering a substantial impedance to currents of positive phase-sequence. The reason for the action just mentioned is that the electromotive force generated by reason of the rotation of the armature in the flux in the brush axes opposes the reactance of the stator and rotor windings of the commutator machine, as well as the reactance of the balancer, when currents of negative phase-sequence are considered, but said generated electromotive force adds to said reactances, when currents of the positive phase-sequence are considered.

It is thus seen that the commutator machine tends to permit the passage of only balanced polyphase currents of one particular phase-sequence, the phase-sequence being determined by the order of connections of the machine.

I wish it to be understood that the accompanying drawing and the above description are intended to be illustrative only, and that the appended claims are to be construed to cover such modifications and equivalents as will readily suggest themselves to those skilled in the art.

I claim as my invention:

1. In a phase-balancing system, the combination with a polyphase line subject to unbalanced conditions, of a shunt-connected balancing device offering a relatively high impedance to symmetrical polyphase currents of one phase-sequence and a relatively low impedance to symmetrical polyphase currents of another phase-sequence, and means responsive to currents of said last mentioned phase-sequence for inherently generating electromotive forces which are substantially equal and opposite to the line-frequency electromotive force drops caused by said relatively low impedance.

2. In a phase-balancing system, the combination with a polyphase line subject to unbalanced conditions, of a shunt-connected balancing device offering an impedance to negative-phase-sequence currents, and means responsive to negative-phase-sequence currents for inherently generating electromotive forces substantially equal and opposite to the line-frequency electromotive force drops caused by said impedance.

3. The combination with a polyphase line subject to unbalanced conditions, of a shunt-connected balancing device offering an impedance to symmetrical polyphase currents of two different phase-sequences, and booster means responsive to currents of one of said phase-sequences for automatically generating electromotive forces of said last-mentioned phase-sequence, said electromotive forces being substantially equal and opposite to the line-frequency electromotive force drops caused by the impedance of said balancing device to currents of said phase-sequence.

4. In a phase-balancing system, the combination with a polyphase line subject to unbalanced conditions, of a shunt-connected balancing device offering an impedance to negative-phase-sequence currents, and a series polyphase commutator-type machine connected to said balancing device in such manner that the phase-sequence of the connections of said commutator machine is different from that of said balancing device.

5. The combination with a polyphase line subject to unbalanced conditions, of a shunt-connected balancing device offering an impedance to symmetrical polyphase currents of two different phase-sequences, and a substantially constant-speed, series-type, polyphase dynamo-electric machine of the commutator type having its brush position and speed so adjusted that it automatically generates electromotive forces tending to neutralize said impedance to currents of the phase-sequence necessary to balance said line.

6. The combination with a polyphase dynamo-electric machine adapted to operate as a phase balancer, of a series polyphase commutator machine connected in series-circuit relation with the primary windings of said balancing machine.

7. The combination with a polyphase circuit subject to unbalanced conditions, of a series balancer provided with a relatively stationary member and a relatively rotatable member, said relatively stationary member having a polyphase winding which is connected in series-circuit relationship with said polyphase circuit to neutralize the impedance of a given portion of said circuit to balanced currents of a given phase-sequence, and said relatively rotatable member carrying a commutator member, an armature winding connected to said commutator member, a plurality of symmetrically spaced brushes bearing upon said commutator member, and means for supplying said brushes with polyphase currents which are proportional and in a given phase relationship to the electromotive force which the booster is designed to generate.

In testimony whereof, I have hereunto subscribed my name this first day of February 1921.

CHARLES LE G. FORTESCUE.